(12) United States Patent
Nadler

(10) Patent No.: US 10,498,955 B2
(45) Date of Patent: Dec. 3, 2019

(54) COMMERCIAL DRONE DETECTION

(71) Applicant: Disney Enterprises, Inc., Burbank, CA (US)

(72) Inventor: Gary J. Nadler, Marlboro, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 7 days.

(21) Appl. No.: 14/816,829

(22) Filed: Aug. 3, 2015

(65) Prior Publication Data

US 2017/0039413 A1    Feb. 9, 2017

(51) Int. Cl.
*G01S 13/14* (2006.01)
*G01S 15/14* (2006.01)
*G01S 7/539* (2006.01)
*G06K 9/62* (2006.01)
*H04N 5/232* (2006.01)
*H04N 5/77* (2006.01)
*H04N 5/247* (2006.01)
*G06K 9/00* (2006.01)
*B64C 39/02* (2006.01)

(52) U.S. Cl.
CPC ..... *H04N 5/23238* (2013.01); *G06K 9/00771* (2013.01); *G06K 9/6201* (2013.01); *H04N 5/247* (2013.01); *H04N 5/77* (2013.01); *B64C 39/024* (2013.01); *B64C 2201/127* (2013.01)

(58) Field of Classification Search
CPC . G01S 15/04; G01S 7/41; G01S 7/539; G01S 13/04; G06K 9/0063; G06K 9/00711; G06K 9/6201; H04N 5/23238; H04N 5/247; H04N 5/77; A61K 31/496; A61K 31/519; A61K 31/5415; A61K 31/551; A61K 31/554; B64C 2201/127; B64C 39/024; C12Q 1/6883; C12Q 2600/106; C12Q 2600/156
USPC .............. 435/6.11; 506/9; 514/211.13, 220, 514/225.8, 254.04, 259.41; 709/19
See application file for complete search history.

(56) References Cited

U.S. PATENT DOCUMENTS

| 6,608,559 | B1 | 8/2003 | Lemelson et al. |
| 7,149,366 | B1 | 12/2006 | Sun |
| 7,680,192 | B2 | 3/2010 | Kaplinsky |
| 7,706,979 | B1 | 4/2010 | Herwitz |
| 7,710,463 | B2 | 5/2010 | Foote |

(Continued)

OTHER PUBLICATIONS

Passary, Anu, "Drone invading your privacy? Now, there's a warning system for that", Tech Times, Jun. 20, 2014 (1 page). Available at http://www.techtimes.com/articles/8816/20140620/drone-invading-your-privacy-now-theres-a-warning-system-for-that.htm. Last accessed Sep. 3, 2015.

*Primary Examiner* — Deirdre L Beasley
(74) *Attorney, Agent, or Firm* — Esplin & Associates, PC

(57) ABSTRACT

One embodiment provides a method of capturing the presence of a drone, including: collecting, using at least one sensor, data associated with an aerial object; analyzing, using a processor, the data to determine at least one characteristic of the aerial object; accessing, in a database, a library of stored characteristics of commercially available drones; determining, based on the analyzing, if the at least one characteristic of the aerial object matches a characteristic of a commercially available drone; and responsive to the determining, generating an indication of a positive match. Other aspects are described and claimed.

17 Claims, 5 Drawing Sheets

(56) References Cited

U.S. PATENT DOCUMENTS

| | | | |
|---|---|---|---|
| 7,969,346 B2 | 6/2011 | Fraceschini | |
| 9,529,360 B1* | 12/2016 | Melamed | G05D 1/0022 |
| 2004/0167667 A1* | 8/2004 | Goncalves | G01C 21/12 |
| | | | 700/245 |
| 2005/0046703 A1 | 3/2005 | Cutler | |
| 2011/0058036 A1 | 3/2011 | Metzger et al. | |
| 2012/0092503 A1 | 4/2012 | Cheng | |
| 2012/0169842 A1 | 7/2012 | Chuang et al. | |
| 2013/0188008 A1 | 7/2013 | Meadow et al. | |
| 2013/0329052 A1* | 12/2013 | Chew | H04N 7/181 |
| | | | 348/159 |
| 2014/0062757 A1 | 3/2014 | Fox et al. | |
| 2014/0098185 A1* | 4/2014 | Davari | H04N 5/23238 |
| | | | 348/36 |
| 2014/0267775 A1* | 9/2014 | Lablans | H04N 5/247 |
| | | | 348/169 |
| 2015/0016712 A1* | 1/2015 | Rhoads | G06K 9/00208 |
| | | | 382/154 |
| 2015/0302858 A1* | 10/2015 | Hearing | G10L 19/00 |
| | | | 381/58 |
| 2016/0055399 A1* | 2/2016 | Hiester | A01K 29/005 |
| | | | 382/110 |
| 2016/0086052 A1* | 3/2016 | Piekniewski | G06T 7/90 |
| | | | 382/103 |
| 2016/0140851 A1* | 5/2016 | Levy | G08G 5/0069 |
| | | | 701/3 |
| 2016/0180719 A1* | 6/2016 | Wouhaybi | G08G 5/0082 |
| | | | 701/4 |
| 2017/0032586 A1* | 2/2017 | Cheatham, III | G07C 5/008 |

* cited by examiner

US 10,498,955 B2

COMMERCIAL DRONE DETECTION

BACKGROUND

Small Unmanned Aerial Vehicles (UAVs), commonly referred to as "commercial drones" or "drones," have recently been made available for consumer purchase and use. Many of these drones can be equipped with information gathering devices such as cameras that can take pictures and record video. Owners are able to direct a drone's flight patterns and have them perform a variety of specified actions. A number of drone owners, particularly those associated with the media, have been directing these devices to fly into private locations where they have taken unauthorized photographs and video of people and things. Determining when an unauthorized drone is flying over private property can be difficult.

BRIEF SUMMARY

In summary, an embodiment provides a method of capturing the presence of a drone, comprising: collecting, using at least one sensor, data associated with an aerial object; analyzing, using a processor, the data to determine at least one characteristic of the aerial object; accessing, in a database, a library of stored characteristics of commercially available drones; determining, based on the analyzing, if the at least one characteristic of the aerial object matches a characteristic of a commercially available drone; and responsive to the determining, generating an indication of a positive match.

Another embodiment provides a system for detecting the presence of a drone, comprising: an array of sensors; an electronic device including a processor that is operatively coupled to the array of sensors; a memory device that stores instructions executable by the processor to: collect, using the array of sensors, data associated with an aerial object; analyze the data to determine at least one characteristic of the aerial object; access, in a database, a library of stored characteristics of commercially available drones; determine if the at least one characteristic of the aerial object matches a characteristic of a commercially available drone; and generate an indication of a positive match.

A further embodiment provides a program product that captures the presence of a drone, comprising: a storage device having code stored therewith, the code being executable by the processor and comprising: code that collects, using at least one sensor, data associated with an aerial object; code that analyzes, using a processor, the data to determine at least one characteristic of the aerial object; code that accesses, in a database, a library of stored characteristics of commercially available drones; code that determines, based on the analyzing, if the at least one characteristic of the aerial object matches a characteristic of a commercially available drone; and code that generates, based on the determining, an indication of a positive match.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims.

DETAILED DESCRIPTION

Figure 1:
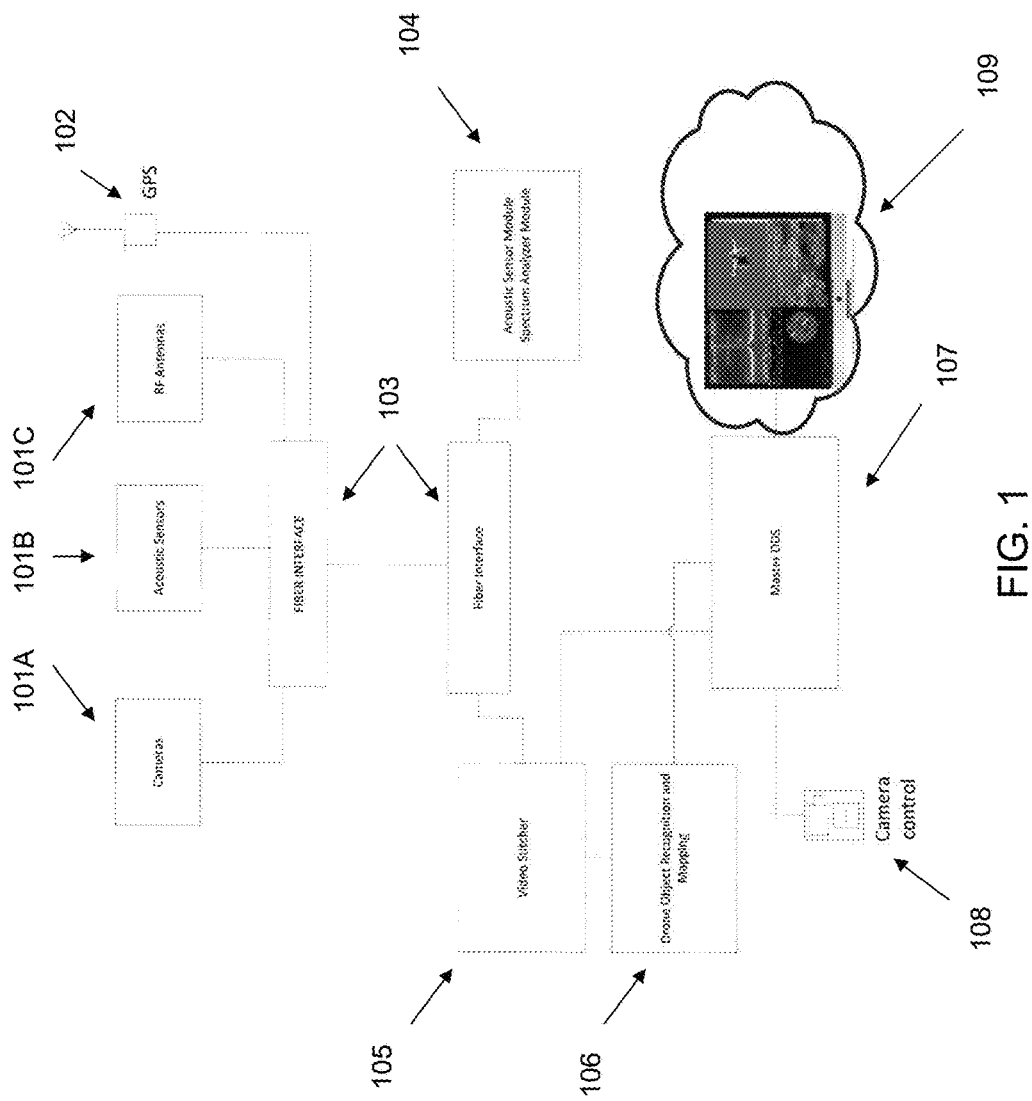
FIG. 1 illustrates an example system for detecting the presence of a drone.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

Drones can be remotely commanded to perform a variety of actions, e.g., fly around, take pictures, and record video. However, certain drone operators may direct the drones to fly over private property and take unauthorized data (e.g., photos, video or audio). In certain instances, these pictures and recordings could capture sensitive information that could subsequently be broadcast to others. For example, a drone could fly over a movie production set and capture video that may give away major aspects and plot points of a film.

In order to minimize the possibility that sensitive information may be inappropriately attained, it may be desirable to be able to detect when a drone is flying, e.g., in the airspace above property. However, the drone detection systems that currently exists are expensive to implement and are not easily deployable. For instance, the Department of Defense (DOD) utilizes a network of large radar systems that would not be feasible for a company or organization to install. In addition, smaller "backpack" type systems that some companies use are labor intensive and expensive.

Accordingly, an embodiment provides a method and system for detecting the presence of a drone. In an embodiment, one or more pods having a variety of identification devices can be strategically positioned in a specified area to monitor the airspace above that area. These pods can be daisy chained to cover large, customizable coverage areas (e.g. trapezoidal shaped sections, implementable around large obstructions, etc.). The identification devices that can be equipped to the pod can include, but are not limited to, video cameras, microphones or acoustic sensors, and radiofrequency (RF) antennas.

In an embodiment, a control center contains a Drone Object Recognition (DOR) library that has information about all the known types of drones that are publicly available. More particularly, the library contains information regarding the various characteristics pertaining to each drone including but not limited to physical appearance, audio signature when in flight, and operating radio frequency or frequencies (e.g., used for data and control communications).

In an embodiment, multiple video cameras can be equipped to each pod. Multiple pods containing multiple video cameras can also be implemented. Using geo-fence technology, for example, each video camera within each pod is given a geo-fence foundation in its area of view. For example, four cameras can be equipped to different sides of a pod and each camera has a 90 degree field of view. In an embodiment, the "live" video from each video camera is sent to a Video Stitch Server (VSS) and a Master Drone Detection Server (MDDS). In an embodiment, the video cameras can be set to constantly record video or can be set to periodically record video for a predetermined amount of time. At the video stitch server, the video recordings from each camera can be combined together to form a singular, 360 degree field of vision. An example video stitching program could be MINDTREE "Manage Mind" Application Software.®

In an embodiment, when recording video in low light situations (e.g. night time) the video cameras may use long range synchronized illuminators that flood the sky with infrared (IR) light. An example of a long range synchronized illuminator is the Ascendant ZLID laser illuminator.

In an embodiment, other identification devices such as acoustic sensors and RF antennas can be equipped to the pods in order to detect the presence of drones. These alternative identification devices can act as a primary or secondary type of identification device or act as confirmation devices for use in a confirmation technique. For example, the other identification devices can be used as the primary identification technique when weather conditions prevent the video cameras from attaining a good visual. In another example, the video cameras may detect an object and identify it as a drone and one or more of the other identification devices can be used as a secondary confirmation technique to confirm the video camera's identification or improve the confidence attributed to the identification.

In an embodiment, the pods may be outfitted with microphones or acoustic sensors that can pick up the noise signature of a drone. Different types of drones emit different noise signatures particular to that drone type, e.g., due to their use of various propellers. The auditory information gathered by the acoustic sensors can then be compared to known auditory signatures in the DOR library.

In an embodiment, a base station containing software may convert the gathered acoustical information to coordinates by using the GPS on each pod for timing and triangulation. Sensors may also be tuned to be sensitive to drone audio signatures. An example of applicable sensors are those by SENTRI Smart Fence by Safety Dynamics.™

In an embodiment, the pods can be outfitted with RF antennas that can register a specific frequency a drone is operating at. For example, it is known that most of the drone systems currently deployed use 2.4 GHZ or 5.8 GHZ video downlinks. Thus, the RF antennas can be tuned to monitor a specific frequency. In an embodiment, a system may scan for particular signatures and, if any are found, they can be compared to known frequencies in the DOR library.

In an embodiment, when the system receives input from one of the various identification devices that matches a certain drone characteristic contained in the DOR library, an alert may be triggered that a drone has likely been detected. At this stage, the system can differentiate between whether the detected drone is domestic (i.e., drones owned or approved by the drone detection system user) or foreign (i.e., drones not owned or approved by the drone detection system user). In an embodiment, the differentiation can be achieved by placing transponders on domestic drones in order to accurately identify and differentiate them from foreign drones that do not have the same transponders. In another embodiment, detected drones can be differentiated visually or by noise signature. Furthermore, based on system configurations, other flying objects in the air space may be ignored. For example, if a bird or another mechanical flying object, such as a helicopter, flew into the designated airspace they would not trigger an alert.

In an embodiment, an alert message may be sent to a system operator at a base station. In another embodiment, an alert may be sent to a remote operator through a communication means such as but not limited to SMS text message or an automated phone message. This would free an operator from continuously monitoring the system, even when no alarm was triggered, and allow the operator to complete other tasks. An example alert message could be, "Possible foreign drone detected in Sector 1, Zone 4."

In an embodiment, the specific identification device that detected the drone can be identified by using GPS positioning. In the case of a video camera, an operator may go to a system monitoring device and take the camera that detected the drone out of the "stitched mode" and place it into an "iso-mode." When in iso-mode, the operator can manually control the camera, such as by magnifying the zoom, to zero in on the detected drone. This way, the operator may physically confirm that the detected object is, in fact, a drone.

In an embodiment, communication data can be collected from the drone. For example, any image, video, or audio that was captured by the drone can be obtained. This can be accomplished by software systems that scan for particular drone signatures and, when found, can then downlink the frequency to view the communication data. In another embodiment, the data control of a specific drone can be detected (i.e. that someone is controlling the drone) by detecting the presence of various signals at expected frequencies within a certain range.

In an embodiment, a stand-alone pod can be deployed for remote operations that require a smaller coverage area. The stand-alone pod can be configured to utilize just one identification feature. The identification feature that is used may be dependent on a variety of factors such as changing weather conditions, sunlight availability, and overall visibility.

The illustrated example embodiments will be best understood by reference to the figures. The following description is intended only by way of example, and simply illustrates certain example embodiments.

Referring to FIG. 1, an example system for detecting the presence of a drone is illustrated. A number of identification devices 101(A-C) can be attached to a pod 201 of FIG. 2 in order to monitor the sky for any aerial objects that may pass through the established geo-fence perimeter. The identification devices 101(A-C) are connected to a fiber interface 103 containing a GPS 102. The GPS 102 can be used to identify the location of each pod 201 and can also be used to locate the drone, e.g., via triangulation using the GPS location, and timing and acoustical information of a drone.

In the example of FIG. 1, the fiber interface 103 is also connected to an acoustic sensor module and a spectrum analyzer module (collectively indicated at 104). The fiber interface 103 is also connected to a video stitcher 105. The video stitcher 105 can combine the various recorded or live viewpoints of each video camera into one. For example, if four video cameras (e.g., in a position of camera 101A) each had a 90-degree field of view, the video stitcher 105 could combine the recordings from all four video cameras 101A into one, producing a singular recording with a 360-degree field of view. This is similar to taking a panoramic image with a digital camera. Further details of such a multi-camera arrangement are described in connection with the example illustrated in FIG. 2.

A Drone Object Recognition (DOR) library 106 is included, one that for example contains information about all the known types of drones that are publicly available. More particularly, the library contains information regarding the various characteristics pertaining to each drone including but not limited to physical appearance, audio signature, and operating radio frequency. The DOR library 106 can be updated as new drones are created and publicly introduced.

In FIG. 1, a Master Drone Detection Server (MDDS) is illustrated at 107. A camera control 108 and monitor 109 are also connected to the MDDS 107. The MDDS 107 presents the video recordings and other gathered information from the identification devices 101(A-C) to an operator through one or more monitors 109. The MDDS 107 also contains an override function where an operator can take a specific camera out of the stitched mode and place it into an iso-mode. In this iso-mode, the operator can use the camera control 108 to control a specific camera to attain a better visual view of an aerial object.

Figure 2:
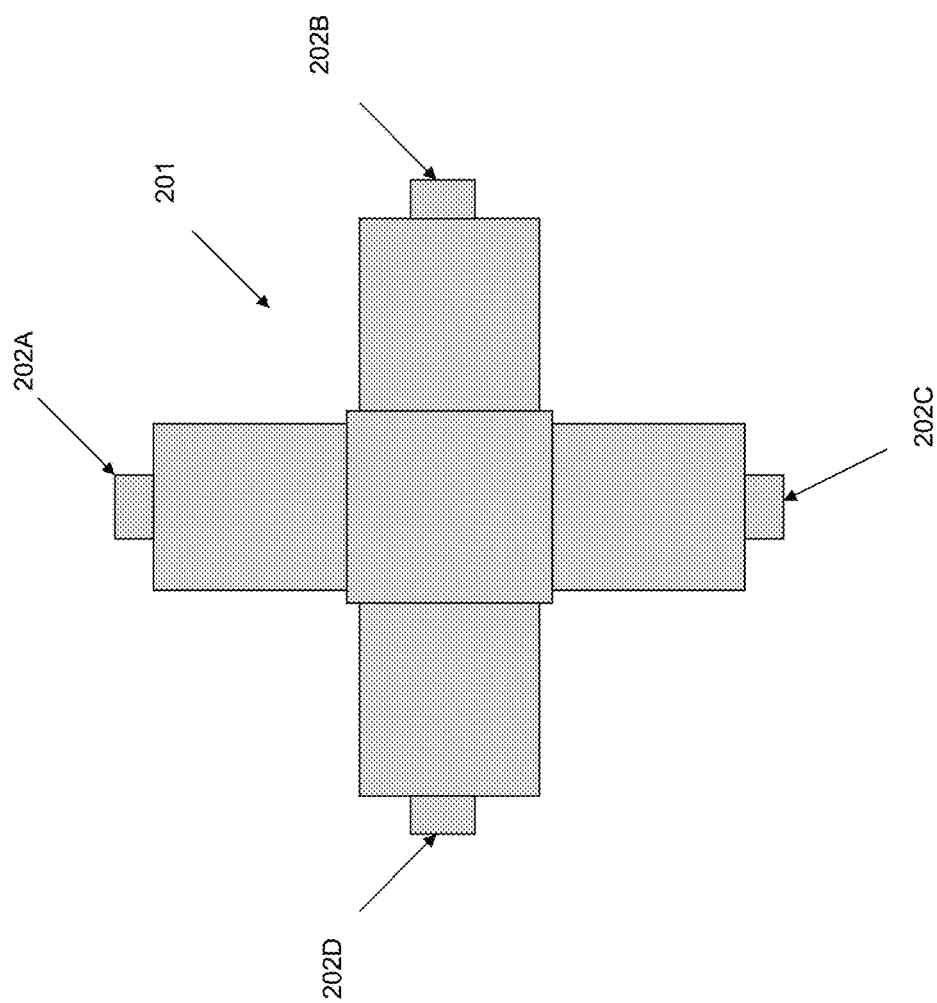
FIG. 2 illustrates an example depiction of a pod.

Referring to FIG. 2, a sample illustration of a pod 201 having a number of video cameras 202(A-D) oriented in various positions is presented. Solely for purposes of this illustration, the only identification device contained in the pod 201 is a video camera. However, other possible identification devices can also be attached to the pod 201 including, but not limited to, acoustic sensors, microphones and RF antennas. The cameras 202(A-D) are illustrated in an arrangement such that each occupies a unique filed of view. Depending on the type of lens used, a camera may have a large field of view and the arrangement may provide overlapping views such that a 360 degree field of view is provided by the multiple cameras. For example, a camera with a so-called fish eye lens may be employed. Likewise, more or fewer cameras may be included, e.g., depending on the field of view desired.

Figure 3:
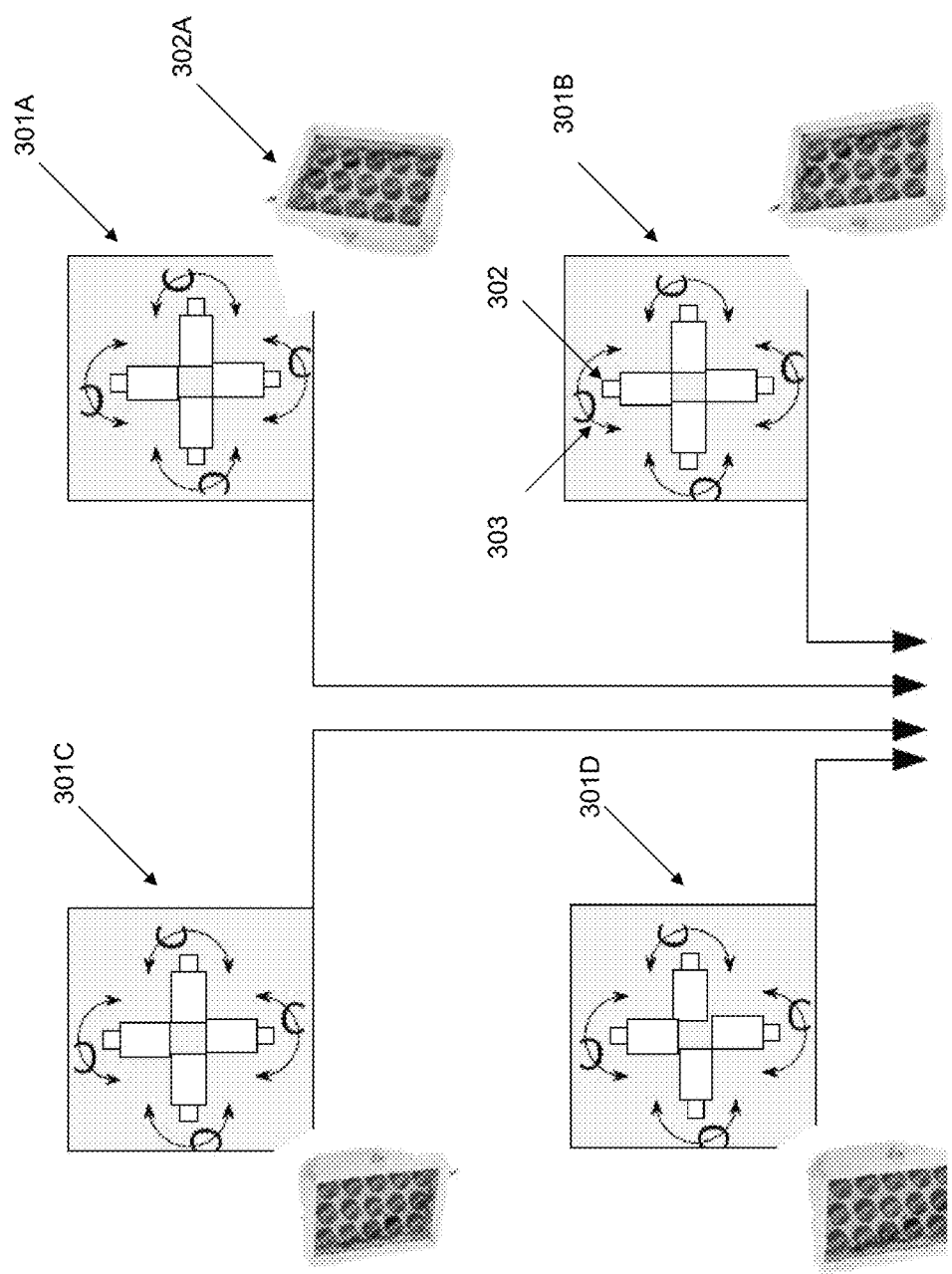
FIG. 3 illustrates an example embodiment of a pod having a number of video cameras oriented to monitor different portions of the sky.

Referring to FIG. 3, a plurality of pods 301(A-D) (such as pod 201 of FIG. 2) are illustrated. Each pod 301(A-D) has a plurality of sensors, one of which is indicated at 302, that are positioned at an end portion of a pod, for example at position 202 in FIG. 2. Each sensor 302 may include a sensor bank, e.g., indicated by call out 302A in FIG. 3. The sensors are oriented about each pod 301(A-D) to monitor a specific field of view, e.g., a 360 degree field of view. With a plurality of such pods 301(A-D), a larger or more diverse area may be monitored. Again, the field of view for a pod, e.g., pod 301B is provided by each sensor, e.g., sensor 302, obtaining a viewpoint, e.g., 303. With a collection of pods 301(A-D), their sensed data (e.g., video data) may be stitched together to form a collective or global field of view, similar to stitching together a single pod's multiple cameras.

Therefore, the video recorded from each of the video cameras in FIG. 3 can be stitched together, e.g., at a Video Stitcher 105 of FIG. 1. Furthermore, an operator can take any particular camera out of stitched mode into an iso-mode such that the operator can control any individual camera in order to attain physical confirmation of a suspected drone.

Figure 4:
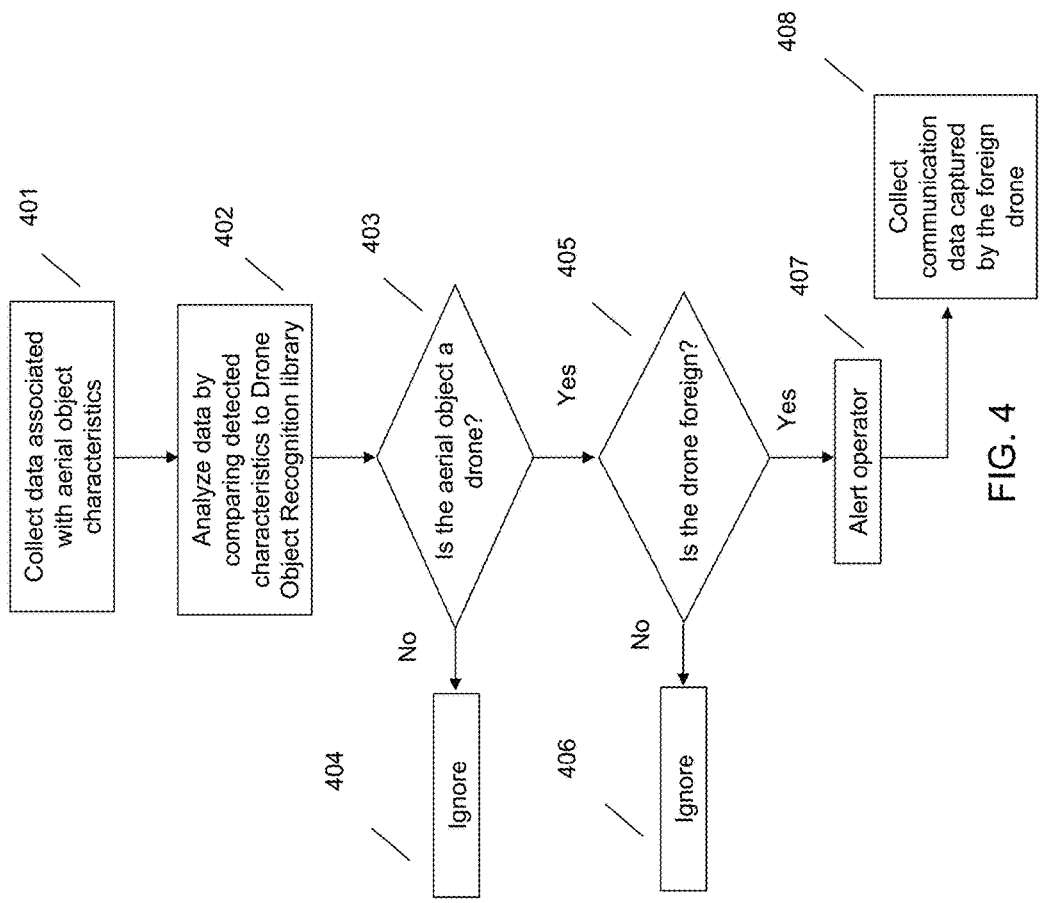
FIG. 4 illustrates an example method of detecting the presence of a drone and alerting an operator if a foreign drone is detected.

Referring now to FIG. 4, an embodiment provides a method for determining the presence of a drone. At 401, aerial object data is collected by various identification devices 101 (A-C) attached to a pod 201. Collected data can include any data corresponding to a characteristic of an aerial object such as but not limited to the object's physical appearance, detectable noise signature, and operating frequency. Identification devices that can be used to detect these characteristics include, but are not limited to, video cameras, microphones, acoustic sensors, and RF antennas. Aerial object data is collected when an aerial object moves into an identification device's field of operation (sensor coverage area).

At 402, any aerial object data gathered by an identification device about an aerial object is then sent to the MDDS containing a DOR library 106 for analysis. In the case of video cameras, the recordings may also be sent to a Video Stitcher 105 to be combined into a singular field of view. The aerial object data may include characteristic data collected at 401 for analysis, e.g., comparing it to known drone characteristics in the DOR library 106.

At 403, if the characteristics of the aerial object do not match any, or a certain number, of known drone characteristics in the DOR library 106, then the aerial object may be ignored 404. However, if any, or a specified number, of characteristics are matched to known drone characteristics in the DOR library 106, then the system may indicate the presence of a drone.

If a drone is identified, the system at 405 can subsequently determine whether the drone is foreign (e.g., not owned by the Drone Detection System user) or domestic (e.g., owned by the Drone Detection System user). This can be accomplished in a number of ways. For highly accurate differentiation, transponders may be placed on domestic drones in order to accurately identify and differentiate them from foreign drones that do not have the same transponders. Detected drones can also be differentiated visually by an overseeing operator or by a noise signature. The degree of detection or the confidence of detection may be varied. For example, a predetermined confidence threshold may be applied to detect a drone generally. This may be a relatively low threshold, e.g., to alert an operator to a suspected drone with a higher false positive rate. Alternatively, a higher threshold may be applied to reduce false positive detection. Likewise, various thresholds may be employed for drone differentiation. As will be appreciated, the degree of confidence assigned to a detection or differentiation may vary based on the amount, type and/or quality of sensed data available.

If a detected drone is determined to be domestic, then it can be ignored, as indicated at 406. However, if a detected drone is determined to be foreign, the system can alert an operator, as indicated at 407. The indication or alert may take a variety of forms. For example, the system may send an alert message to one or monitors 109 indicating that a foreign drone has been identified. Alternatively, the system can also send an SMS text message or other communication to an operator's mobile device that a foreign drone has been detected.

At 408, an operator can then choose to collect the communication data, if any, captured by the drone. Software in the system can be used to downlink a particular drone's frequency to collect the data. Examples of communication data include, but are not limited to, images, video, or audio data. The system can display this information on one or more monitors 109 that an operator can look at to see exactly what data was captured by the drone.

Figure 5:
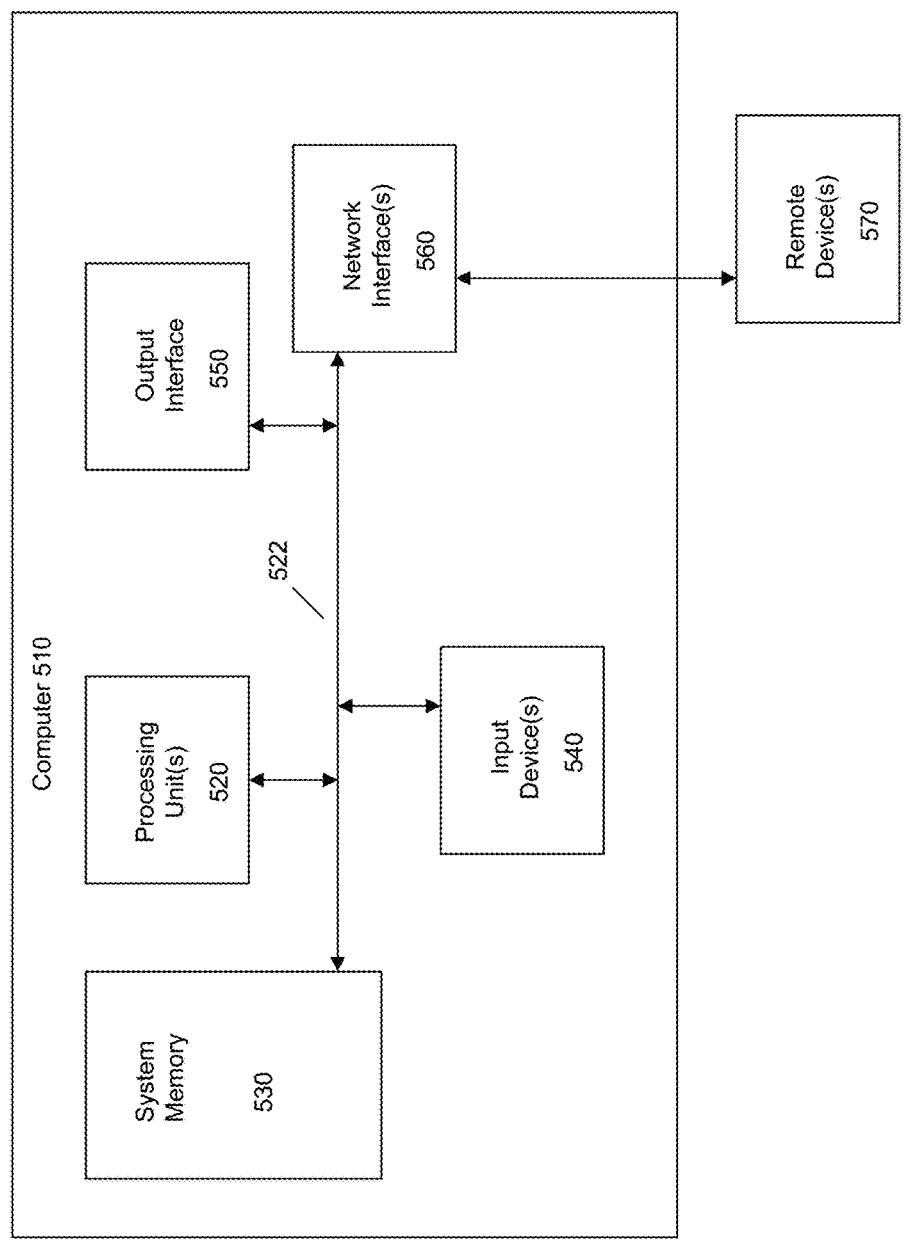
FIG. 5 illustrates an example computing device.

It will be readily understood by those having ordinary skill in the art that a variety of computing devices may be employed in implementing various embodiments. Referring to FIG. 5, an example device that may be used in implementing embodiments includes information handling device 510 in the form of a computer.

Components of information handling device 510 may include, but are not limited to, at least one processing unit 520, a system memory 530, and a system bus 522 that couples various system components including the system memory 530 to the processing unit(s) 520. The information handling device 510 may include or have access to a variety of computer readable media. The system memory 530 may include computer readable storage media in the form of volatile and/or nonvolatile memory such as read only memory (ROM) and/or random access memory (RAM). By way of example, and not limitation, system memory 530 may also include an operating system, application programs, other program modules, and program data.

A user can interface with (for example, enter commands and information) the information handling device 510 through input devices 540. A monitor or other type of device can also be connected to the system bus 522 via an interface, such as an output interface 550. In addition to a monitor, information handling devices may also include other peripheral output devices. The information handling device 510 may operate in a networked or distributed environment using logical connections (network interface 560) to other remote computers, databases, cameras, sensors or devices (remote device(s) 570). The logical connections may include a network, such as a local area network (LAN) or a wide area network (WAN), or a cellular network, but may also include other networks.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of capturing the presence of a drone, comprising:

collecting, using an array of pods, data associated with an aerial object, each pod in the array of pods comprising a plurality of sensors capable of collecting different types of the data, wherein the different types of data comprise at least two types of data selected from the group consisting of video data, acoustic data, and radiofrequency communication data;
determining a confidence score for each of the different types of the data, wherein the confidence score is a representation of data quality;
analyzing, using a processor, the different types of the data to determine at least one characteristic of the aerial object;
accessing, in a database, a library of stored characteristics of commercially available drones;
prioritizing the different types of the data based on a current weather condition, wherein the prioritizing comprises ignoring types of the different types of the data identified as having a confidence score below a predetermined threshold in the current weather condition;
determining, based on the analyzing and the prioritizing, if the at least one characteristic of the aerial object matches a characteristic of a commercially available drone; and
responsive to the determining, generating an indication of a positive match.

2. The method of claim 1, wherein the at least one characteristic of the aerial object is selected from the group consisting of physical appearance, noise signature and operating frequency.

3. The method of claim 2, wherein the operating frequency comprises a control communication frequency.

4. The method of claim 2, further comprising:
determining, from the data associated with the aerial object, an operating frequency of the aerial object; and
collecting, using a receiver and storage device, communication data of the aerial object.

5. The method of claim 4, further comprising analyzing the communication data to obtain one or more of video data and image data captured by the aerial object.

6. The method of claim 1, wherein the at least one sensor comprises an array of video cameras;
said method further comprising:
sending, to a server, video data captured by the array of video cameras; and
stitching together the video data captured by the array of video cameras to create a field of view greater than a specified field of view of any individual video camera.

7. The method of claim 6, further comprising:
identifying at least one video camera in the array of video cameras that detects the aerial object; and
placing the at least one video camera into an isolation mode.

8. The method of claim 7, further comprising operating the at least one video camera in isolation mode in response to operator inputs.

9. A system for detecting the presence of a drone, comprising:
an array of pods, each pod in the array comprising a plurality of sensors capable of collecting different types of data, wherein the different types of data comprise at least two types of data selected from the group consisting of video data, acoustic data, and radiofrequency communication data;
an electronic device including a processor that is operatively coupled to the array of pods;
a memory device that stores instructions executable by the processor to:
collect, using the array of pods, data associated with an aerial object;
determine a confidence score for each of the different types of the data, wherein the confidence score is a representation of data quality;
analyze the different types of the data to determine at least one characteristic of the aerial object;
access, in a database, a library of stored characteristics of commercially available drones;
prioritize the different types of the data based on a current weather condition, wherein the prioritizing comprises ignoring types of the different types of the data identified as having a confidence score below a predetermined threshold in the current weather condition;
determine, based on the analyzing and the prioritizing, if the at least one characteristic of the aerial object matches a characteristic of a commercially available drone; and
generate an indication of a positive match.

10. The system of 9, wherein the at least one characteristic of the aerial object is selected from the group consisting of physical appearance, noise signature and operating frequency.

11. The system of claim 10, wherein the operating frequency comprises a control communication frequency.

12. The system of claim 10, wherein the instructions are further executable by the processor to:
determine, from the data associated with the aerial object, an operating frequency of the aerial object; and
collect, using a receiver and storage device, communication data of the aerial object.

13. The system of claim 12, wherein the instructions are further executable by the processor to:
analyze the communication data to obtain one or more of video data and image data captured by the aerial object.

14. The system of claim 10, wherein the at least one sensor comprises an array of video cameras; and
wherein the instructions are further executable by the processor to:
send, to a server, video data captured by the array of video cameras; and
stitch together the video data captured by the array of video cameras to create a field of view greater than a specified field of view of any individual video camera.

15. The system of claim 14, wherein the instructions are further executable by the processor to:
identify at least one video camera in the array of video cameras that detects the aerial object; and
place the at least one video camera into an isolation mode.

16. The system of claim 15, wherein the instructions are further executable by the processor to:
operate, the at least one video camera in isolation mode in response to operator inputs.

17. A program product that captures the presence of a drone, comprising:
a storage device having code stored therewith, the code being executable by the processor and comprising:
code that collects, using an array of pods, data associated with an aerial object, each pod in the plurality of comprising a plurality of sensors capable of collecting different types of the data, wherein the different types of data comprise at least two types of data selected from the group consisting of video data, acoustic data, and radiofrequency communication data;

code that determines a confidence score for each of the different types of the data, wherein the confidence score is a representation of data quality;
code that analyzes, using a processor, the different types of the data to determine at least one characteristic of the aerial object;
code that accesses, in a database, a library of stored characteristics of commercially available drones;
code that prioritizes the different types of the data based on a current weather condition, wherein the code that prioritizes comprises code that ignores types of the different types of the data identified as having a confidence score below a predetermined threshold in the current weather condition;
code that determines, based on the analyzing and using the different types of the data having a confidence score greater than a predetermined threshold, if the at least one characteristic of the aerial object matches a characteristic of a commercially available drone; and
code that generates, based on the determining, an indication of a positive match.

* * * * *